United States Patent [19]
Beilfuss

[11] Patent Number: 5,873,519
[45] Date of Patent: Feb. 23, 1999

[54] ELECTRONIC THERMOSTAT WITH MULTIPLE PROGRAM OPTIONS

[75] Inventor: Robert C. Beilfuss, Smyrna, Tenn.

[73] Assignee: Heatcraft Inc., Grenada, Miss.

[21] Appl. No.: 914,454

[22] Filed: Aug. 19, 1997

[51] Int. Cl.⁶ ............................... F24F 7/00; F24B 19/00
[52] U.S. Cl. ........................................ 236/46 R; 165/238
[58] Field of Search ......................... 236/46 R; 165/238; 364/557

[56] References Cited

U.S. PATENT DOCUMENTS

| | | | |
|---|---|---|---|
| 4,200,910 | 4/1980 | Hall | 236/46 R |
| 4,206,872 | 6/1980 | Levine | 236/46 R X |
| 4,308,991 | 1/1982 | Peinetti et al. | 236/46 R |

*Primary Examiner*—William Wayner
*Attorney, Agent, or Firm*—W. Kirk McCord

[57] ABSTRACT

An electronic thermostat is provided with multiple program options respecting particular days per week and particular periods in each day for which the temperature setpoint is discretely programmable. The user may select from among four program options. The first option allows the user to select the number of programmable periods per day and to enter the temperature setpoint for each selected period separately for each day of the week. The second option allows the user to select the number of programmable periods per day and the temperature setpoint for each selected period for the days Monday through Friday separately from the days Saturday and Sunday. Further, Saturday and Sunday are also separately programmable. The third option is the same as the second option, except that the program settings for Saturday and Sunday are the same. The fourth option corresponds to each day of the week having the same program settings. The user can therefore choose the particular option which best suits his or her lifestyle and other preferences.

16 Claims, 2 Drawing Sheets

ELECTRONIC THERMOSTAT WITH MULTIPLE PROGRAM OPTIONS

DESCRIPTION

1. Technical Field

This invention relates generally to electronic thermostats for controlling a space conditioning system to maintain a desired temperature in an indoor space and in particular to an electronic thermostat having multiple program options respecting the number of discretely programmable days per week and the number of discretely programmable periods per day.

2. Background Art

A thermostat is typically used in operative association with a space conditioning system, such as a heating and/or air conditioning unit, to control ambient temperature in an indoor space. A temperature sensor is typically associated with the thermostat to provide an indication of ambient temperature in the space. Programmable electronic thermostats have become more prevalent in recent years. An electronic thermostat includes a processor, such as a microcomputer, which continually compares the ambient temperature measured by the temperature sensor with a predetermined temperature setpoint entered by a user. When the ambient temperature rises above or falls below the temperature setpoint, as the case may be, by a predetermined temperature increment, the thermostat energizes a heating or cooling relay, as the case may be, to activate the space conditioning system. When operating properly, the thermostat controls the space conditioning system to maintain the space temperature within a few degrees in either direction of the temperature setpoint.

Currently, electronic thermostats are provided which are user-programmable for different periods during a twenty-four hour daily cycle. For example, one may want to enter a different temperature setpoint for the daytime hours from the temperature setpoint for the nighttime hours, depending on the season, one's lifestyle and other factors. However, such thermostats usually offer only limited options as far as choosing the particular days per week and the particular periods per day for which the temperature setpoint is discretely programmable. Some thermostats may require the temperature settings to be programmed separately for each day of the week, while other thermostats may require the same programmed settings to be used for each day of the week. Persons with relatively complicated lifestyles may prefer a thermostat which provides the capability to program each day separately, while those with relatively uncomplicated lifestyles may prefer a thermostat which does not need to be programmed separately for each day of the week.

There is, therefore, a need for an electronic thermostat having multiple program options with respect to the number of days per week and the number of periods per day which are discretely programmable so that a user can select the option that best fits his or her lifestyle and other preferences.

SUMMARY OF THE INVENTION

In accordance with the present invention, an electronic thermostat for controlling operation of a space conditioning system to maintain a desired ambient temperature in an indoor space is comprised of memory means for storing user-entered program instructions; user-operable first input means for entering a first set of program instructions into the memory means, whereby a user is able to select from a plurality of program options respecting particular days per week and particular periods per day for which a temperature setpoint corresponding to the desired ambient temperature is discretely programmable; user-operable second input means for entering a second set of program instructions into the memory means to indicate the temperature setpoint for each particular period selected by the user; and processing means for processing the first and second sets of program instructions and information indicating ambient temperature in the space in accordance with a predetermined set of control instructions to control operation of the space conditioning system.

In accordance with a feature of the invention, the particular periods per day selected by the user are constrained to be the same for each of the day of the week.

In accordance with one embodiment of the invention, the program options include a first option, whereby the temperature setpoint for each selected period is discretely programmable for each day of the week.

In accordance with another embodiment of the invention, the program options further include a second option, whereby the temperature setpoint programmed for each selected period is constrained to be the same for certain days of the week (e.g., Monday through Friday have the same have the same program settings) and is discretely programmable for the remaining days of the week (eg., Saturday and Sunday are individually programmable).

In accordance with yet another embodiment of the invention, the program options further include a third option, whereby the temperature setpoint programmed for each selected period is constrained to be the same for certain days of the week (e.g., Monday through Friday have the same program settings) and is constrained to be the same for the remaining days of the week (e.g., Saturday and Sunday have the same program settings, but are programmable separately from Monday through Friday).

In accordance with a preferred embodiment of the invention, a fourth option is also available, whereby the temperature setpoint programmed for each selected period is constrained to be the same for each day of the week. In accordance with the present invention, a user may select from among multiple program options, depending upon his or her lifestyle and/or other preferences. If a user wants to program each day separately, he or she would select the aforementioned first option. On the other hand, if the user wants the same program settings for each day of the week, he or she would select the aforementioned fourth option. Alternatively, a user may want to program certain days of the week the same and other days of the week differently. For example, he or she may want Monday through Friday to have the same program settings and Saturday and Sunday to have different program settings from Monday through Friday's settings. In that case, the user would select either the aforementioned second option or third option so that Saturday or Sunday could be programmed differently from Monday through Friday. The difference between the second and third options is that Saturday and Sunday are individually programmable pursuant to the second option, whereas pursuant to the third option, Saturday and Sunday are constrained to have the same program settings, even though they can be different from the Monday through Friday program settings.

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly depict certain features of the invention.

Figure 1:
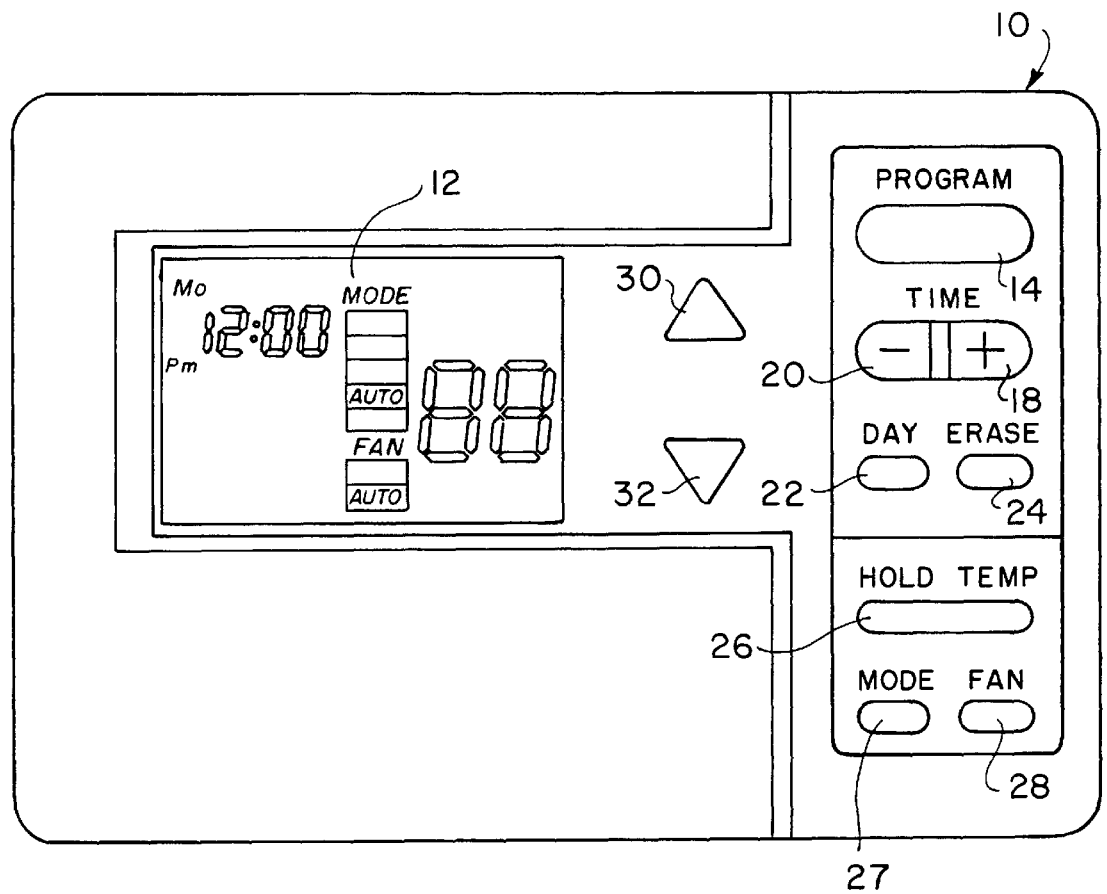
FIG. 1 is a front elevation view of a programmable electronic thermostat, according to the present invention.

Referring to FIG. 1, an electronic thermostat 10, according to the present invention, includes a display 12, which is preferably a liquid crystal display, for displaying time and temperature parameters, and plural user-operable buttons for programming and controlling the mode of operation of thermostat 10. All of the buttons are part of a rubber keypad assembly. PROGRAM button 14 is used to enter and review program settings. TIME+ and TIME− buttons 18, 20 are used to enter and change the program's time settings and to set time of day. DAY button 22 is used to enter the day of the week for programming and to review the program settings. It is also used to set the current day of the week. ERASE button 24 is used to erase an entire program or individual program segments. HOLD TEMP button 26 is used to temporarily override the program instructions and to hold the current temperature setpoint for a user-defined length of time. MODE button 27 is used to select the equipment operating mode to the user's desired mode. FAN button 28 is used to select the mode of operation of the fan associated with the space conditioning system. UP ARROW and DOWN ARROW buttons 30, 32 are used to set desired program temperature set points and to temporarily override the programmed temperature setpoint.

FIG. 1 shows the information displayed during the normal run mode of thermostat 10. The day of the week (e.g., "Mo" for Monday) and the time of day (e.g., 12:00 PM) are displayed on the left side of display 12, while the ambient temperature of the conditioned space (e.g., "88" for 88° F.) is displayed on the right side of display 12. The center portion of display 12 indicates the current operating mode of thermostat 10 (e.g., AUTO) and the current operating mode of the fan associated with the space conditioning system (e.g., AUTO).

Figure 2:
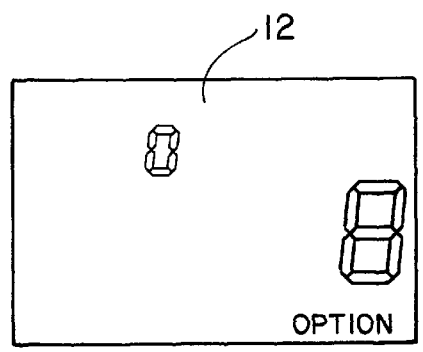
FIG. 2 is a front elevation view of the display portion of the thermostat of FIG. 1.

In accordance with the present invention, thermostat 10 includes multiple program options with respect to entering temperature setpoints for selected periods of time during a seven-day cycle. The temperature setpoint corresponds to the ambient temperature to be maintained within the conditioned space. To select one of the options, the user pushes PROGRAM button 14 and MODE button 27 simultaneously for a predetermined length of time (e.g., four seconds). Referring also to FIG. 2, a particular option number (e.g., "8") along with the word "OPTION" is displayed in the lower right corner of display 12 and the current value for that particular option (e.g., "0") is displayed in the upper left corner of display 12. The user can then either increment or decrement the option value using TIME+ button 18 or TIME− button 20, as the case may be, and can increment or decrement the option number using UP ARROW button 30 or DOWN ARROW button 32, as the case may be.

Option "8" corresponds to the particular days in each weekly cycle which are discretely programmable with respect to temperature setpoints. Option value "0" corresponds to a first program option wherein each day of the week is separately programmable with respect to the temperature setpoints for selected periods each day. Within option "8", the user is able to select from among four values ("0", "1", "2" and "3"). As previously mentioned, option value "0", if selected, would allow the user to program each day of the week separately. Option value "1" corresponds to a second option wherein Monday through Friday are constrained to have the same program settings, but Saturday and Sunday are individually programmable. Option value "2" corresponds to a third option, which is similar to the second option, except that Saturday and Sunday are constrained to have the same program settings. Option value "3" corresponds to a fourth option wherein each day of the week is constrained to have the same program settings.

In addition to being able to select the particular days per week which are discretely programmable, the user can also select particular periods per day which are discretely programmable. To select this program option, the user pushes UP ARROW 30 to increment the option number from "8" to "9". The user then operates UP ARROW 30 and DOWN ARROW 32 to select the option value. Within option "9", the user can select from among three option values corresponding to the number of discretely programmable periods per day (2, 3 and 4). If option value "2" is selected, the number of programmable periods in each day are two, corresponding to day (DAY) and night (NITE). If option value "3" is selected, the number of programmable periods in each day is three, corresponding to morning MORN), day (DAY) and night (NITE). If option value "4" is selected, the number of programmable periods in each day is four corresponding to morning (MORN), day (DAY), evening (EVE) and night (NITE). Once the number of programmable days per week and the number of programmable periods per day are selected pursuant to options "8" and "9", respectively, PROGRAM button 14 and MODE button 27 are depressed simultaneously for the predetermined length of time (e.g., four seconds) to return to the normal run mode. The particular periods per day selected by the user pursuant to option "9" are the same for each day of the week, irrespective of the particular days which are selected to be discretely programmable pursuant to option "8", even though a different temperature setpoint may be entered for a corresponding period during each discretely programmable day.

The temperature setpoint for each time period selected by the user may now be entered. PROGRAM button 14 is pushed to enter the program mode. UP ARROW and DOWN ARROW buttons 30, 32 are used to enter the temperature setpoint for each selected period. The selected period (e.g., "MORN" for morning) and day (e.g., "Su" for Sunday), or days when plural days are programmed simultaneously, are displayed in the upper left portion of display 12 above the time display. Once the temperature setpoint has been entered for that particular period, the user presses PROGRAM button 14 again and the next programmable period is displayed. The same procedure is then followed to enter the temperature setpoint for each succeeding period previously selected by the user.

Figure 3:
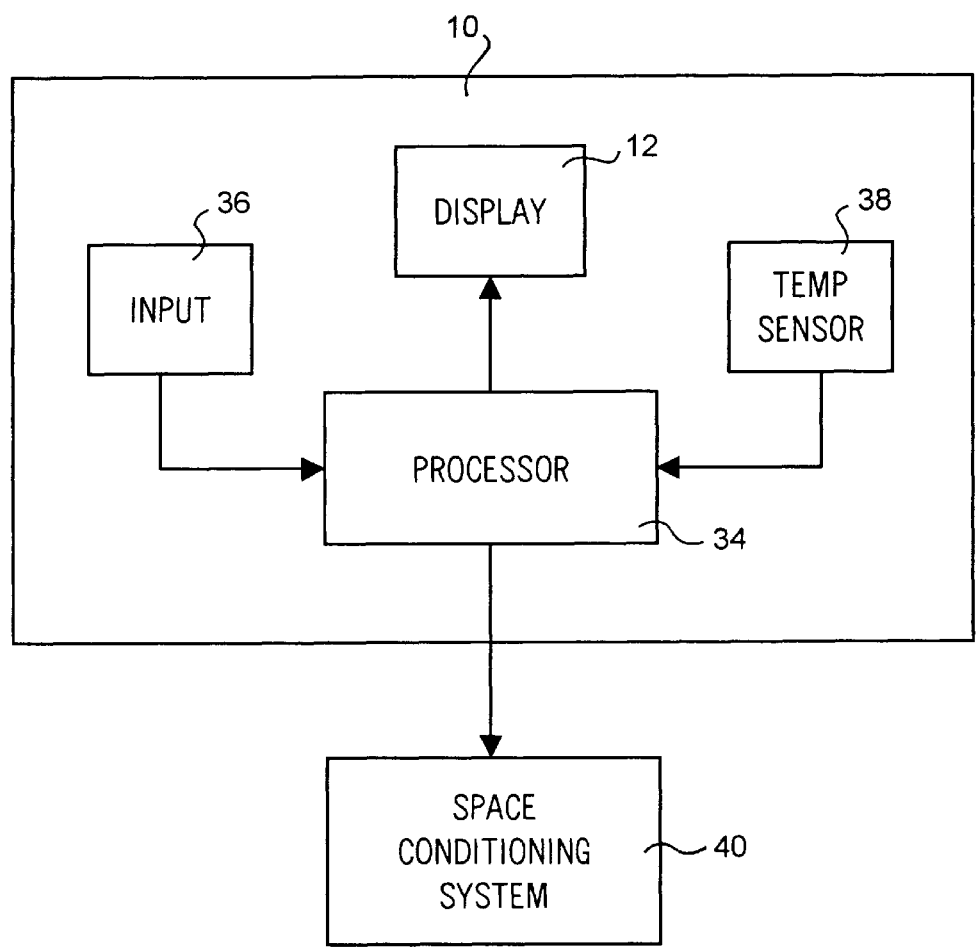
FIG. 3 is a simplified block diagram of the major components of the thermostat of FIG. 1.

Referring to FIG. 3, the major components of thermostat 10 include a processor 34, an input device 36 and a temperature sensor 38, as well as display 12. Processor 34 is preferably a microcomputer of the PIC 16C923-04I/PT type, manufactured and sold by Microchip Technology, Inc. of Chandler, Ariz., and includes a memory for storing a predetermined set of control instructions and user-entered program instructions. Input device 36 is comprised of the various user-operable buttons comprising the rubber keypad assembly described hereinabove, whereby a user is able to program and control operation of thermostat 10. Sensor 38 is preferably a thermistor for measuring ambient temperature of an indoor space and for providing an indication thereof.

In operation, a user enters program instructions via input device 36, as described hereinabove. Such program instructions include temperature setpoints for user-selected time periods for each day of a seven day cycle. Processor 34 is responsive to the user-entered program instructions and to ambient temperature as measured by sensor 38 for controlling the operation of an external space conditioning system 40. Space conditioning system 40 typically includes a heating and/or air conditioning unit. Processor 34 controls display 12 to display selected time and temperature information in accordance with the control instructions stored in processor 34.

In accordance with the present invention, thermostat 10 provides a user with multiple program options from which to choose, depending on the user's lifestyle and other preferences. If the user's lifestyle is relatively complicated, he or she may want to enter different program settings for each day of the week. On the other hand, if his or her lifestyle is relatively uncomplicated, the same program settings may suffice for each day of the week. Alternatively, the user may prefer to have the same settings on Monday through Friday, but different settings on Saturday and Sunday. In that case, the user can select an option whereby he or she can program Monday through Friday simultaneously and Saturday and Sunday separately.

The best mode for carrying out the invention has now been described in detail. Since changes in and modifications to the above-described best mode may be made without departing from the nature, spirit and scope of the invention, the invention is not to be limited to the above-described details, but only by the appended Claims and their equivalents.

I claim:

1. A programmable electronic thermostat for controlling operation of a space conditioning system to maintain a desired ambient temperature in an indoor space, said thermostat comprising:

memory means for storing user-entered program instructions;

user-operable first input means for entering a first set of program instructions into said memory means, whereby a user is able to select from a plurality of program options respecting particular days per week and particular periods per day for which a temperature setpoint is discretely programmable, said particular periods per day being constrained to be the same for each day of the week, said temperature setpoint corresponding to the desired ambient temperature during a corresponding period;

user-operable second input means for entering a second set of program instructions into said memory means, said second set of program instructions indicating the temperature setpoint for each particular period per day selected by the user; and processing means for processing said first and second sets of program instructions and information indicating ambient temperature in the indoor space in accordance with a predetermined set of control instructions, to control operation of the space conditioning system.

2. The thermostat of claim 1 wherein said program options include a first program option, whereby the temperature setpoint for each period per day selected by the user is discretely programmable for each day of the week, and a second program option, whereby the temperature setpoint programmed for each period per day selected by the user is constrained to be the same for certain days of the week and is discretely programmable for the remaining days of the week.

3. The thermostat of claim 2 wherein said program options further include a third program option, whereby the temperature setpoint programmed for each period per day selected by the user is constrained to be the same for a first group of predetermined days of the week and is constrained to be the same for a second group of predetermined days of the week.

4. The thermostat of claim 3 wherein said program options further include a fourth program option, whereby the temperature setpoint programmed for each period per day selected by the user is constrained to be the same for each day of the week.

5. The thermostat of claim 2 wherein said program options include a third program option, whereby the temperature setpoint programmed for each period per day selected by the user is constrained to be the same for each day of the week.

6. The thermostat of claim 1 wherein said program options include a first program option, whereby the temperature setpoint for each period per day selected by the user is discretely programmable for each day of the week, and a second program option, whereby the temperature setpoint programmed for each period per day selected by the user is constrained to be the same for a first group of predetermined days of the week and is constrained to be the same for a second group of predetermined days of the week.

7. The thermostat of claim 6 wherein said program options further include a third program option, whereby the temperature setpoint programmed for each period per day selected by the user is constrained to be the same for each day of the week.

8. The thermostat of claim 1 wherein said program options include a first program option, whereby the temperature setpoint for each period per day selected by the user is discretely programmable for each day of the week, and a second program option, whereby the temperature setpoint programmed for each period per day selected by the user is constrained to be the same for each day of the week.

9. The thermostat of claim 1 wherein said program options include a first program option, whereby the temperature setpoint programmed for each period per day selected by the user is constrained to be the same for certain days of the week and is discretely programmable for the remaining days of the week, and a second program option, whereby the temperature setpoint programmed for each period per day selected by the user is constrained to be the same for a first group of predetermined days of the week and is constrained to be the same for a second group of predetermined days of the week.

10. The thermostat of claim 9 wherein said program options further include a third program option, whereby the temperature setpoint programmed for each period per day selected by the user is constrained to be the same for each day of the week.

11. The thermostat of claim 1 wherein said available options further include a first program option, whereby the temperature setpoint programmed for each period per day selected by the user is constrained to be the same for each day of the week, and a second program option, whereby the temperature setpoint programmed for each period per day selected by the user is constrained to be the same for a first group of predetermined days of the week and is constrained to be the same for a second group of predetermined days of the week.

12. The thermostat of claim 1 further including a temperature sensor operable to sense ambient temperature in the space and to provide said information indicating ambient temperature, said processing means being responsive to the ambient temperature sensed by said temperature sensor to control operation of the space conditioning system.

13. The thermostat of claim 1 wherein said particular periods per day are selectable by the user from a plurality of predetermined time intervals spanning a twenty-four hour day.

14. A programmable electronic thermostat for controlling operation of a space conditioning system to maintain a desired ambient temperature in an indoor space, said thermostat comprising:

memory means for storing user-entered program instructions;

user-operable first input means for entering a first set of program instructions into said memory means, said first set of program instructions indicating a number of discretely programmable days per week and a number of discretely programmable periods per day selected from a plurality of program options, said number of discretely programmable periods per day selected by a user being constrained to be the same for each day of the week, each discretely programmable period corresponding to a period of time for which a temperature setpoint corresponding to the desired ambient temperature is discretely programmable;

user-operable second input means for entering a second set of program instructions into said memory means, said second set of program instructions indicating the temperature setpoint for each period selected by the user; and processing means for processing said first and second sets of program instructions and information indicating ambient temperature in the space in accordance with a predetermined set of control instructions to control operation of the space conditioning system.

15. The thermostat of claim 14 further including a temperature sensor operable to sense ambient temperature in the space and to provide said information indicating ambient temperature, said processing means being responsive to the ambient temperature sensed by said temperature sensor to control operation of the space conditioning system.

16. The thermostat of claim 14 wherein said number of discretely programmable periods is selectable from a plurality of predetermined time intervals spanning a twenty-four hour day.

* * * * *